(12) United States Patent
Maurice et al.

(10) Patent No.: US 12,097,719 B2
(45) Date of Patent: Sep. 24, 2024

(54) PROCESS FOR MARKING AN OPTICAL EYEGLASS

(71) Applicant: ESSILOR INTERNATIONAL, Charenton-le-Pont (FR)

(72) Inventors: Sebastien Maurice, Charenton-le-Pont (FR); Pamela McClimans, Farmers Branch, TX (US); Luc Martin, Charenton-le-Pont (FR); Mark Hale, Farmers Branch, TX (US)

(73) Assignee: Essilor International, Charenton-le-Pont (FR)

( * ) Notice: Subject to any disclaimer, the term of this patent is extended or adjusted under 35 U.S.C. 154(b) by 317 days.

(21) Appl. No.: 16/315,758

(22) PCT Filed: Jul. 6, 2017

(86) PCT No.: PCT/EP2017/066868
§ 371 (c)(1),
(2) Date: Jan. 7, 2019

(87) PCT Pub. No.: WO2018/007489
PCT Pub. Date: Jan. 11, 2018

(65) Prior Publication Data
US 2019/0308434 A1 Oct. 10, 2019

(30) Foreign Application Priority Data
Jul. 7, 2016 (EP) ...................... 16305859

(51) Int. Cl.
*B41M 5/24* (2006.01)
*B29D 11/00* (2006.01)
(Continued)

(52) U.S. Cl.
CPC ......... *B41M 5/24* (2013.01); *B29D 11/00317* (2013.01); *B29D 11/00336* (2013.01);
(Continued)

(58) Field of Classification Search
CPC ... B41M 5/24; B41M 3/003; B29D 11/00317; B29D 11/00923; B29D 11/00336; B29D 11/00009; G02C 7/021
See application file for complete search history.

(56) References Cited

U.S. PATENT DOCUMENTS 6,281,468 B1 8/2001 Souel et al.
2001/0013921 A1 8/2001 Wu et al.
(Continued)

FOREIGN PATENT DOCUMENTS

CN 101842190 A * 9/2010 ......... B24B 13/0055
FR 2843913 3/2004
(Continued)

OTHER PUBLICATIONS

Machine translation, FR 2843913 (Year: 2004).*
(Continued)

*Primary Examiner* — Michael G Miller
(74) *Attorney, Agent, or Firm* — Norton Rose Fulbright US LLP

(57) ABSTRACT

The invention relates to a process for marking an optical eyeglass (1) equipped with a surface coating (5) comprising the following steps: A step of detreating by means of a laser beam, so as to locally detreat an area of the optical eyeglass by removing the surface coating (5) until a lower layer (7) of the eyeglass (1) is reached, which layer is located under said coating (5) and made of a material that is different from the surface coating (5), thus forming at least one the detreated zone (6, 11), A step of depositing an ink (9) in the detreated zone (6, 11) in order to form at least one inked pattern (4), so that the ink (9) adheres to the lower layer (7) present at the bottom (10) of the detreated zone (6, 11).

14 Claims, 2 Drawing Sheets

Figure 1A:
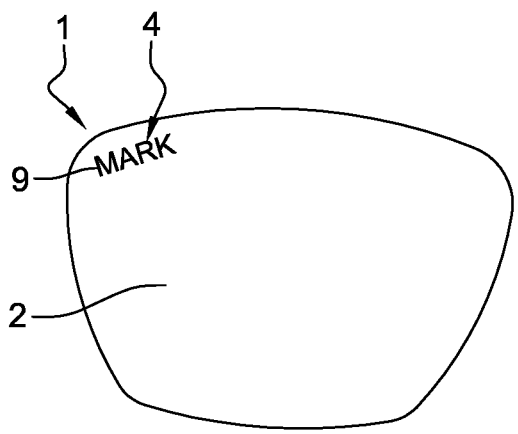

(51) Int. Cl.
*B41M 3/00* (2006.01)
*G02C 7/02* (2006.01)

(52) U.S. Cl.
CPC ....... *B29D 11/00923* (2013.01); *B41M 3/003* (2013.01); *G02C 7/021* (2013.01)

(56) References Cited

U.S. PATENT DOCUMENTS

| | | | |
|---|---|---|---|
| 2003/0085934 A1 | 5/2003 | Tucker et al. | |
| 2004/0130676 A1 | 7/2004 | Doshi et al. | |
| 2008/0023137 A1* | 1/2008 | Jiang | G02C 7/02 156/230 |
| 2008/0273073 A1* | 11/2008 | Oakley | B29D 11/00009 347/103 |
| 2011/0293818 A1* | 12/2011 | Madigan | B41F 16/00 427/66 |
| 2013/0063955 A1* | 3/2013 | Rinko | F21V 5/00 362/351 |
| 2015/0277143 A1 | 10/2015 | Lippens et al. | |
| 2015/0343673 A1 | 12/2015 | Williams | |
| 2016/0207249 A1* | 7/2016 | Maurice | B29D 11/00932 |

FOREIGN PATENT DOCUMENTS

| | | | |
|---|---|---|---|
| FR | 2843913 A1 * | 3/2004 | ....... B29D 11/00009 |
| WO | WO 2015/040338 | 3/2015 | |
| WO | WO-2015040338 A1 * | 3/2015 | ........... B23K 26/067 |

OTHER PUBLICATIONS

Machine Translation, CN 101842190 (Year: 2010).*
International Search Report and Written Opinion issued in International Patent Application No. PCT/EP2017/066868, dated Sep. 14, 2017.
Search Report issued in European Application No. 16305859, dated Oct. 3, 2016.

* cited by examiner

PROCESS FOR MARKING AN OPTICAL EYEGLASS

CROSS-REFERENCE TO RELATED APPLICATIONS

This application is a national phase application under 35 U.S.C. § 371 of International Application No. PCT/EP2017/066868 filed 6 Jul. 2017, which claims priority to European Patent Application No. 16305859.7 filed 7 Jul. 2016. The entire contents of each of the above-referenced disclosure is specifically incorporated by reference herein without disclaimer.

The invention relates to a process for marking an optical eyeglass. Optical eyeglasses are generally marked by depositing ink on the surface of said eyeglasses, the marks produced being intended to represent a distinctive sign, for example possibly a number, a letter, a simple shape or a more complex pattern. Currently, certain of these optical eyeglasses possess an anti-smudge surface coating the main properties of which are that it is hydrophobic and oleophobic. Now, because of the presence of this coating, it is particularly difficult to deposit an ink on the surface of these eyeglasses and to maintain the pattern in the state in which it was deposited on the eyeglasses. Specifically, the deposited ink does not adhere well to such a coating, and may rapidly be completely or partially rubbed off, or adopt a truncated geometry or shape bearing no relation to the initial characteristics of the mark.

A marking process according to the invention allows ink to be deposited on an optical eyeglass having undergone an anti-smudge surface treatment, the mark produced not degrading over time even if a finger is repeatedly passed thereover.

To ensure the invention is clearly understood, it is assumed that an optical eyeglass has a front face and a back face, said back face being that face of the eyeglass which is intended to be closest to the eye when the eyeglass is fitted in a frame and the latter is being worn by an individual. The anti-smudge coating delimits at least the front face of the eyeglass.

One subject of the invention is a process for marking an optical eyeglass equipped with a surface coating comprising the following steps:

A step of detreating by means of a laser beam, so as to locally detreat an area of the optical eyeglass by removing the surface coating until a lower layer of the eyeglass is reached, which layer is located under said coating and made of a material that is different from the surface coating, thus forming at least one detreated zone, A step of depositing an ink in the detreated zone in order to form at least one inked pattern, so that the ink adheres to the lower layer present at the bottom of the detreated zone.

The objective of such a process is to locally remove the surface coating, which prevents the ink from adhering, in order to reach a layer of the ophthalmic lens having properties allowing said ink to be retained. Specifically, the surface coating may for example consist of an anti-smudge coating characterised by its hydrophobic and oleophobic properties, which are not favourable to adhesion of the deposited ink. Thus, according to the invention, each detreated zone, possibly a recessed print or a hole, also referred to as a hole, passes at least right through the thickness of the surface coating. Preferably, the ink used is made from a material that sets. It is therefore deposited on the eyeglass in liquid or low-viscosity form, then hardens after a few seconds or a few minutes. The surface coating delimits the front face of the eyeglass. However, it is not impossible that a temporary coating be placed on the surface coating and, in this case, a marking process according to the invention also applies to such a eyeglass, and is such that the hole or recessed print goes through the surface coating, even when the latter is present under said temporary coating. According to one embodiment of a process according to the invention, the detreated zone may be likened to a recessed print, obtained by means of a specific scan of the laser beam over the surface of the eyeglass. According to another embodiment of a process according to the invention, the detreated zone consists of a multitude of small holes in the surface of the eyeglass. In the latter configuration, the holes may be likened to pixels. The recessed print represents a pattern or a macroscopic element of a distinctive pattern, for example possibly a letter, a number, a logo or a word. In the case where the detreated zone is made up of a plurality of holes forming pixels, a marking process according to the invention allows at least two inks of different colours to be deposited in the holes, in order to obtain a two-colour or polychromatic pattern or macroscopic pattern element without running the risk of the inks mixing in their low-viscosity state. A marking process according to the invention may be applied, either to a cut eyeglass, or to an uncut eyeglass. By cut eyeglass, one means an eyeglass of which the peripheral shape is adapted to affix the eyeglass to a specific frame. Usually this adaptation has been done during a cutting or edging step.

Furthermore, in order to fully clarify the meaning of all the terms used in the rest of the description, it is important that the following notions be specified:

The present invention can be used in all kinds of optical devices and elements, such as ophthalmic elements and devices. Non-limiting examples of ophthalmic elements include corrective and non-corrective lenses or eyeglasses, including single vision or multi-vision lenses, which may be either segmented or non-segmented, as well as other elements used to correct, protect, or enhance vision, magnifying lenses and protective lenses or visors such as found in spectacles, glasses, goggles and helmets. The optical article of the present invention is preferably a lens, and more preferably an ophthalmic lens. Especially, ophthalmic lens is a lens which is designed to fit a spectacles frame so as to protect the eye and/or correct the sight and can be an non-corrective (also called plano or afocal lens, for example for sunglasses, sport-specific eyeglasses or for filtering particular wavelengths) or corrective ophthalmic lens. Corrective lens may be a unifocal, a bifocal, a trifocal or a progressive lens. Accordingly, in general, in the context of the invention, the term "eyeglass" or "optical eyeglass" refers to any of the above ophthalmic lenses or ophthalmic elements.

A pattern to be produced in an optical eyeglass using a process according to the invention consists of at least one macroscopic element, for example possibly a number, a letter or any type of graphic, each macroscopic element resulting from the deposition of an ink in at least one detreated zone of the surface of the eyeglass, A detreated zone of the eyeglass corresponds in the context of the invention to a zone of the eyeglass from which the surface coating has been removed, and may therefore be likened to a hole or a recessed print, In the context of the invention, a surface coating is a surface-modifying coating the main action of which is to modify the surface properties of the lens when it is finally used mounted in an ophthalmic frame. The expression "surface coating" thus comprises hydrophobic, oleophobic or hydrophilic coatings having the property of being anti-smudge, anti-rain or antifog coatings. The application is more particularly applicable to lenses including an anti-smudge coating (because, as is widely known, inks adhere weakly to anti-smudge coatings) in particular when it is desired to form a permanent mark that is intended to remain on the lens throughout the lifetime of the lens and for as long as it is used.

Each macroscopic element of the pattern may be made up of a single continuous detreated zone, or of a small number of detreated zones, said zone having the shape and size of said macroscopic element to be produced. In this configuration, the detreated zone is homogenous and may be likened to a recessed print, Each macroscopic element may also be made up of a multitude of detreated zones, each of said detreated zones being a discrete unitary well or crater. In this configuration, each detreated zone may be likened to a pixel and the macroscopic element of the pattern to be produced results from a particular arrangement of said detreated zones over the surface of the eyeglass, said arrangement prefiguring the element of the pattern to be produced, A pattern may comprise at least one macroscopic element made up of a single continuous detreated macroscopic zone, and at least one macroscopic element made up of a plurality of pixels, Each macroscopic element may also comprise a portion made up of a continuous macroscopic detreated zone, and a portion made up of a multitude of pixels, The terms "over" or "under" in the context of the invention are meant relatively to the substrate. Accordingly, a first coating being under a second coating means that the first coating is comprised between the second coating and the substrate; conversely a second coating being over a first coating means that the second coating is farther from the substrate than the first coating.

The detreated zone produced by the laser beam extends beyond the surface coating in order to have a bottom delimited by a material that is not hydrophobic and/or oleophobic and that will therefore allow the ink to adhere. Thus, the ink, which does not adhere to the surface of the eyeglass including the anti-smudge treatment, is able to bind to the one or more detreated zones through the hydrophobic or oleophobic coating as those zones do not contain any more hydrophobic or oleophobic coating.

According to an embodiment of the invention, the optical eyeglass includes an interference stack, of the antireflection or interference-mirror type, located between the surface coating and a substrate and optionally separated from the substrate by one or more varnishes, said at least one detreated zone passing through the surface coating and the interference stack.

According to a further embodiment of the invention, the detreatment step allows at least two separate detreated zones to be obtained that are arranged in at least one group forming a macroscopic pattern element. In this configuration, each detreated zone is macroscopic and represents alone one element of the desired macroscopic pattern.

According to a further embodiment of the invention, the ink is deposited in excess and extends beyond said at least one detreated zone, said process furthermore comprising a step of removing the ink that has overflowed from said at least one detreated zone. Although it is not specifically sought to obtain an optical eyeglass including ink outside of the detreated zones, using enough ink to ensure the ink overflows said detreated zones would however appear to be an advantageous way of making sure that each hole is systematically filled. A marking process according to the invention makes provision for the ink deposited in excess on the eyeglass to be removed in order to ensure the outline of the pattern is correctly delimited.

In such case, the removing step can be carried out by means of an adhesive laid flat on the surface coating, said adhesive being removed and taking with it the ink that overflowed from said at least one detreated zone onto said coating. It is possible for a temporary coating to be present over the surface coating. In this case, the adhesive takes with it not only the excess ink but possibly also at least some of the temporary coating. In this configuration it is assumed that the detreated zone formed by the laser beam also passes through the temporary coating. The adhesive may for example be borne by a piece of paper or a fabric or a polymer film.

The invention is in particular of great advantage when the lens is covered with such a temporary coating. Specifically, by means of the process according to the invention, the inked pattern may be produced on the lens despite the presence of the temporary coating, which is generally used to facilitate the blocking of the lens in an edging operation. Before the process according to the invention was invented, it was very difficult to produce a permanent ink pattern on a lens including such a temporary coating. Specifically, said pattern, deposited on the temporary coating, was generally removed or weakened during the removal of the temporary coating. It was therefore necessary to produce the inked pattern after the temporary coating had been removed, i.e. after the edging step.

According to an embodiment of the invention, the ink is hardened after deposition, by drying, polymerisation or thermosetting, and the step of removing the excess ink is carried out when said ink is still liquid or soft. Specifically, the inventors have noted that if the ink is removed once it has solidified rather than when the ink is liquid or soft, portions of the ink present in the detreated zone may be torn away at the same time as the sections of excess ink.

Preferably, the detreated zones form wells, also identified as craters, that are separated from one another or at least one detreated zone consists of a plurality of adjoining wells separated from one another by a protrusion comprising no surface coating. In this configuration, each detreated zone is a discrete hole that may be likened to a pixel.

Advantageously, said wells have substantially the same dimensions as those of the laser beam at a point of impact with the surface. According to one embodiment, the laser beam produces a well after a plurality of successive impacts without being scanned over the surface of the eyeglass. Each well is discrete and possesses dimensions substantially equal to the width of the laser beam.

According to one embodiment of a process according to the invention, the detreated zones have an area the largest dimension of which is comprised between 10 µm and 500 µm. In this way, a detreated zone may be discrete and serve as a unitary element (which may be likened to a pixel) of a pattern or of a macroscopic pattern element, or indeed form a recessed print forming alone the pattern or a macroscopic pattern element.

Moreover, in one embodiment of a process according to the invention, the detreated zones have a depth comprised between 0.01 µm and 10 µm, so as to at least pass through the oleophobic and/or hydrophobic surface coating layer; in particular, the depth may be between 0.5 μm and 5 μm, so as to pass through the optional interference coating without however penetrating into or at least penetrating too deeply into the material of the substrate.

According to one embodiment of a process according to the invention, the step of depositing the ink in said at least one detreated zone is carried out by pad printing by means of an inking stamp, which is preferably dimensioned to cover at least the entirety of the pattern created by the at least one detreated zone created on the surface of the optical eyeglass. Thus, the stamp will directly cover the entirety of the pattern, and the deposition of ink to produce said pattern is performed in a single step.

Preferably, the inking stamp is dimensioned to cover at least all the detreated zones created in the optical eyeglass. With such a stamp, the ink risks overflowing from the pattern if coverage of all the detreated zones is to be guaranteed. It will then be necessary to carry out a step of removing excess ink, for example by means of an adhesive.

Advantageously, a marking process according to the invention comprises a step of determining the inked pattern from a list of at least two different inked patterns, the dimensions of the inking stamp being such that said inking stamp deposits the ink so as to form a similar print for at least two inked patterns of said list. Specifically, the process according to the invention allows one and the same inking stamp to be used for a plurality of inked patterns that it is desired to see placed on lenses. In particular, the process according to the invention allows flexibility in the mark produced and makes it possible not to have to change parts when the pattern is changed. Specifically, to produce various marks there is no need either for specific stamps or masks.

Advantageously, a marking process according to the invention comprises a step of establishing a frame of reference of an uncut eyeglass, i.e. a non-edged eyeglass, said step including a step of determining a position of the pattern on the eyeglass taking into account a shape of the cut eyeglass and mounting data, so as to place the pattern in a zone comprised in the outline of the cut eyeglass, the step of creating detreated zones being carried out on the as yet uncut eyeglass. Specifically, the inventors have identified that taking into account mounting parameters, the shape of the cut eyeglass and mounting data, allows the marking process according to the invention to be carried out on an as yet uncut eyeglass. This in particular makes it possible to be able to mount the cut eyeglass in a frame directly after the cutting step, without having to wait for the marking step and for the possible time taken for the ink to dry. This in particular makes it possible not to have to wait for the edging step to carry out the marking of the eyeglass. Since the marking step is carried out upstream of the edging step, it may be carried out by one marking centre, for example an ophthalmic laboratory, in relation with a plurality of cutting centres, for example opticians. Moreover, this in addition makes it possible to mount the edged eyeglass in a frame directly after the edging step, without having to wait for the marking step and for the possible time taken for the ink to dry.

According to another embodiment of a marking process according to the invention, the step of depositing the ink is carried out by inkjet printing. This is an alternative technique to that involving an inking stamp.

According to such an embodiment of the invention, the detreated zones form wells, or craters, that are separated from one another or at least one detreated zone forms a plurality of wells, and one single ink droplet is deposited per well. In this configuration, the process of the invention can be such that the volume of the droplet is at least equal to the volume of the well so that the ink at least completely fills the volume of said well. In case of overflow of the ink from the well, a process according to the invention comprises a step of removing ink deposited in excess.

Advantageously, at least two adjacent wells include an ink of different colour. In this way, a partially or completely multicolour pattern possessing a very marked distinctive character is produced.

Advantageously, when the detreated zone formed by a plurality of points of impact of the laser comprises a thinned zone at least one dimension of which, such dimension being parallel to the surface of the eyeglass, is smaller than those of an ink droplet deposited on the material of the bottom of said thinned zone, the excess ink is absorbed by an adjacent zone of larger size or is removed with suitable removing means. Specifically, the ink deposited in excess in the thinned zone may be removed, either actively with suitable removing means such as for example an adhesive, or passively by capillary action towards a larger adjacent zone. It is therefore possible, by virtue of the process according to the invention, to produce ink marks that have a definition, or in any case certain dimensions, that are finer than the definition or dimensions of the inkjet printing apparatus used, or in any case finer than the dimensions of the droplets used.

Another subject of the invention is an apparatus comprising means suitable for emitting a laser beam, means able to deposit an ink and a holder able to hold the eyeglass, said holder remaining stationary throughout the duration of the marking process and said means being movable in order to be alternatively placeable level with an identified zone of the eyeglass in order allow the eyeglass to be marked. In this way, since the coordinates of the holder in space are known and since the eyeglass is not moved throughout the duration of the marking process, it is possible to program the movement of the means involving a laser beam and the means for depositing ink in order to end up with a precise and perfectly reproducible mark on the eyeglass.

Another subject of the invention is an optical eyeglass including a surface coating, at least one detreated zone in said coating, and ink that is absorbent in the visible and/or UV spectrum, present in said detreated zone.

The marking machine is for example such as described in patent application WO 2015/040338 of the Applicant, an exemplary use of which is described below.

A process according to the invention has the advantage of being able to mark an optical eyeglass by means of a pattern having varied characteristics in terms of shape, size and colour. Specifically, such a marking may for example be produced with at least two colours. As a result, a large range of marks, which may be adapted to specific customer requests and be given a particularly distinctive character, may be obtained. In addition, it is advantageously possible to mark an optical eyeglass that has undergone a prior surface treatment, such as for example an anti-smudge treatment. A process according to the invention is therefore able to mark any type of optical eyeglass intended to be fitted in a frame. Lastly, such a process has the advantage of being able to mark an as yet uncut eyeglass, i.e. an eyeglass no yet edged to the shape of the frame, be it a finished lens or a semi-finished lens, allowing said process to be used at any moment in the life of the eyeglass. As a result, such a process is operationally flexible and not subject to the severe constraints of programming in the marking for a precise moment of the manufacture of the eyeglass.

Figure 1B:
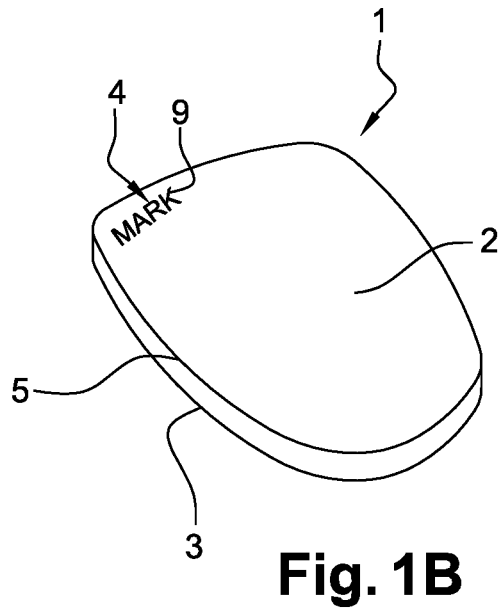
Figure 2:
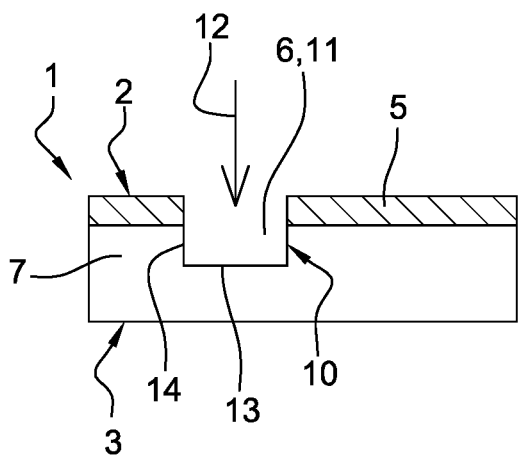
Figure 3:
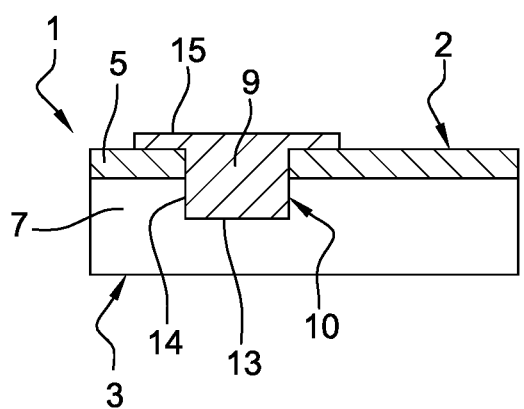
Figure 4:
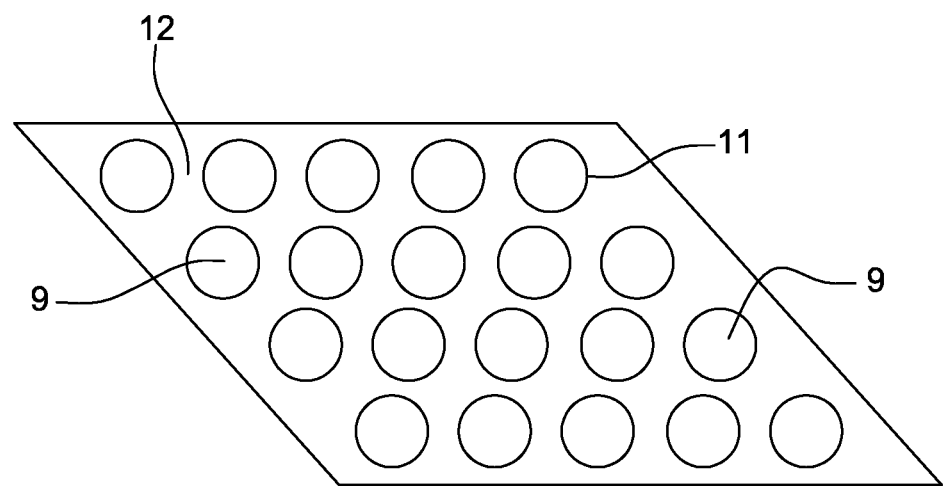
Figure 5:
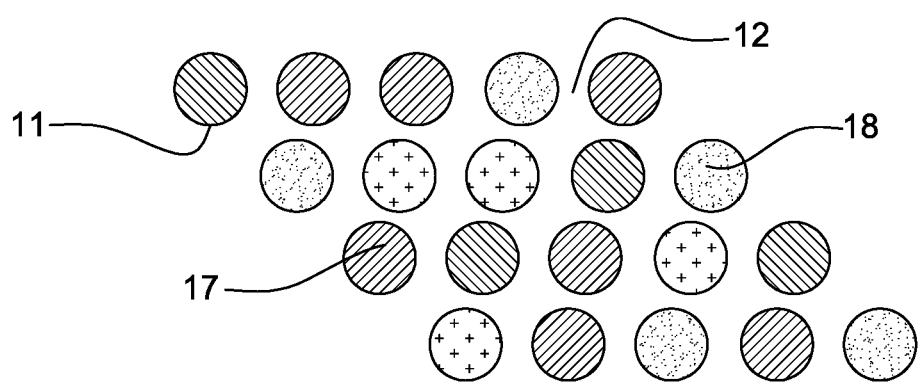

Below, a detailed description of one preferred embodiment of a method for marking an optical eyeglass according to the invention is given with reference to the following figures:

FIG. 1A is a front view of an optical eyeglass having undergone marking by means of a process according to the invention, FIG. 1B is a perspective view of the optical eyeglass in FIG. 1A, FIG. 2 is a schematic cross-sectional view of an optical eyeglass illustrating a first step of a marking process according to the invention, FIG. 3 is a schematic cross-sectional view of an optical eyeglass illustrating a second step of a marking process according to the invention, FIG. 4 is an enlarged view of a portion of one pattern produced on an optical eyeglass by means of a marking process according to the invention, said portion being monochromatic and produced by pixelisation, FIG. 5 is an enlarged view of a portion of one pattern produced on an optical eyeglass by means of a marking process according to the invention, said portion being multicoloured and produced by pixelisation, With reference to FIGS. 1A and 1B, an optical eyeglass 1 has a front face 2 and a back face 3, said back face 3 being that face of the eyeglass 1 which is intended to be closest to the eye when said eyeglass 1 is fitted in a frame and the latter is being worn by an individual. A marking process according to the invention is intended to produce a distinctive pattern 4 on the front face 2 of the eyeglass 1 in order for said pattern 4 to be visible by a third person looking at the individual wearing a frame containing said marked eyeglass 1. Preferably, the pattern 4 is produced on the periphery of the eyeglass 1 in order not to disrupt the vision of the individual wearing a frame equipped with such an eyeglass 1. This pattern 4 may take any form and may for example consist of at least one number, or of at least one letter, or of a combination of numbers and/or letters. Thus, a pattern may for example be an identifiable word. It may also take the form of a logo possibly for example containing a specific graphic. A pattern 4 may be made up of one or more macroscopic elements.

Certain optical eyeglasses 1 benefit from a surface treatment, for example in order to prevent dust and/or water from settling on the front face 2 of the eyeglass 1 when an individual is wearing spectacles equipped with these eyeglasses 1. Thus, the eyeglass 1 possesses, on its front face 2, a surface coating 5 consisting of a hydrophobic and oleophobic layer.

An optical eyeglass 1 is generally marked by means of a deposition of an ink on the front face 2 of the eyeglass 1. However, the presence of such a hydrophobic and oleophobic surface coating 5 prevents the ink 9 from effectively adhering to the surface of the eyeglass 1, making the marking thereof questionable. In certain cases, a mark may seem to have been satisfactorily produced, but the presence of the surface coating 5 decreases the robustness of the pattern 4 and makes it nonpermanent, and liable to deteriorate or deform over the lifetime of the lens or over the time it is used.

The principle of a marking process according to the invention consists in removing material from the front face 2 of the eyeglass 1 until a deep layer located under the surface coating 5, and which allows the ink deposited on the surface of said eyeglass 1 to bind tightly, is reached. In other words, the surface coating 5 is removed locally and the lens is thus locally detreated of the surface coating 5.

One process according to the invention, allowing an optical eyeglass 1 equipped with a hydrophobic and oleophobic surface coating 5 to be marked, comprises the following steps:

A step of detreating by means of a laser beam, so as to locally detreat a surface 2 of the optical eyeglass 1 by removing the surface coating 5 until a lower layer 7 of the eyeglass 1 is reached, which layer is located under said coating 5 and made of a material that is different from the surface coating 5, thus forming at least one detreated zone 6, 11, A step of depositing an ink 9 in the detreated zone 6, 11 in order to form at least one inked pattern 4, so that the ink 9 adheres to the lower layer 7 present at the bottom of the detreated zone 6, 11.

The detreated zones 6, 11 in the eyeglass 1 have the shape and dimensions of the pattern 4 that it is desirable to see printed on the eyeglass 1. It is important to underline that the pattern 4 or at least one macroscopic element of said pattern 4 may be made up either of a plurality of discrete detreated zones 11 that may be likened to discrete or quasi-discrete holes 11 (in this case each detreated zone 11 may be likened to one pixel) or of a single detreated zone 6 that may be likened to a macroscopic recessed print having the shape and dimensions of the pattern 4 or of a macroscopic element of said pattern 4.

With reference to FIG. 2, each detreated zone 6, 11 is produced by means of an irradiation by a laser beam of the surface coating 5, this allowing a lower layer 7 of the eyeglass 1, which layer is located under said coating 5, to be reached, said lower layer 7 being distinct from said surface coating 5. Thus, where it is applied, the laser beam completely destroys the thickness of the surface coating 5 in the direction indicated by the arrow 12. If the optical eyeglass 1 were to include an interference stack, of the antireflection or interference-mirrored type, located under the anti-smudge coating 5, said at least one detreated zone 6, 11 would pass through said anti-smudge coating 5 and said interference stack. It is assumed in that example that only the surface coating 5 is hydrophobic and oleophobic, and that the layers 7 of the eyeglass 1 which are located under said coating 5 are neither hydrophobic nor oleophobic and are able to bind the ink 9 deposited in each detreated zone 6, 11.

Thus, the marking depth may be comprised between 0.01 µm and 10 µm and more particularly between 0.5 µm and 5 µm. In the second depth range, the bottom 10 of the detreated zone 6, 11 is present in the varnish. The detreated zone 6, 11 passes through the interference coating but does not reach the substrate. In one particular example, the marking depth is close to 1 µm, or even close to 2 µm.

When the detreated zone 6 is a macroscopic recessed print, the laser beam is programmed to scan the surface of the eyeglass 1 and to make a plurality of passes over the eyeglass 1, said beam removing a bit more material from the eyeglass 1 on each pass in order to reach a layer for binding the ink 9, which layer is located under the surface coating 5. The movements of the laser beam over the eyeglass 1 are programmed to produce the pattern 4 or macroscopic element of said pattern 4 to be drawn on the eyeglass 1.

With reference to FIGS. 4 and 5, according to another embodiment of a marking process according to the invention, the pattern 4 or the macroscopic element of said pattern 4 is made up of a plurality of separate discrete detreated zones 11 that may be likened to pixels. In this configuration, each detreated zone 11 is a hollow well having substantially the same dimensions as those of the laser beam, at the point of impact of the laser beam with the surface 2 of the lens 1.

In other words, according to one variant embodiment of a marking process according to the invention, each well 11 is almost cylindrical, the diameter of each of said wells 11 being substantially equal to the diameter of said beam at the point of intersection of the beam with the surface 2 of the lens 1. In this example, each well 11 is gradually produced by way of a plurality of successive irradiations by the laser beam, without movement of said beam over the eyeglass 1.

According to a first preferred embodiment of a process according to the invention, the wells 11 may be organized so as to adjoin, two successive wells 11 following one directly after the other without any thickness of material arranged therebetween. The total area of surface presented by the adjoining wells 11 exhibits a certain adherence with respect to the deposited ink 9, and thus allows the latter to be effectively bound. In this configuration, it is preferable to deposit one ink 9 of a given colour to obtain a monochromatic pattern 4, because two inks of different colours would be liable to mix in these adjoining wells 11.

With reference to FIGS. 4 and 5, according to a second preferred embodiment of a process according to invention, the discrete wells 11, also identified as craters, do not adjoin and have a thickness 12 of material between them. In this configuration, since the wells 11 are separated from one another, it is possible to deposit at least two inks 17, 18 of different colours in said wells 11, because the risk of said two inks 17, 18 mixing is minimal or even zero. In an embodiment, the wells 11 are separated one from the other by a part comprising some hydrophobic and/or oleophobic surface coating 5, either apparent or under some temporary material.

According to another embodiment, the wells 11 adjoin to the extent that they are no longer individually distinct and separate from one another. They then define a macroscopic recessed print the bottom of which is smooth.

With reference to FIG. 2, according to an embodiment of the invention, whatever the shape and size of the detreated zone 6, 11, the bottom 10 of said detreated zone 6, 11 corresponds to the deepest portion 13 of this detreated zone 6, 11, which is generally flat or approximately flat, and to a portion 14 of the side wall delimiting the detreated zone 6, 11 and originating level with said deepest portion 13.

The step of depositing the ink 9 in each detreated zone 6, 11 is advantageously but nonlimitingly carried out by means of a technique chosen from pad printing and inkjet printing.

Preferably, the ink 9 chosen for a depositing process according to the invention is an ink that is able to be set a few minutes after its deposition on the eyeglass 1. This ink 9 may for example be set by drying, thermosetting or polymerisation.

Schematically, the pad-printing technique consists in depositing, by means of an inking stamp, the ink 9 on a macroscopic pattern created in the optical eyeglass 1. Preferably, once the pattern 4 to be deposited on the eyeglass 1 is known, the inking stamp is then dimensioned to cover an area, for example a simple geometric shape, for example a parallelepipedal shape or an ovoid shape, that is slightly larger than that of said pattern 4 and that frames said pattern 4. In this way, with reference to FIG. 3, the ink 15 will then overflow from the detreated zone 6, 11. Although it is not particularly sought to deposit ink 9, 15 in excess in a process according to the invention, it may however prove to be advantageous to deposit a superabundance of ink 9, 15 because it makes it possible to ensure that the ink 9 will at least completely fill each detreated zone 6, 11. Two additional advantages are obtained thereby:

It is possible to use a given stamp for two or more different or even very different patterns 4.

Moreover, by means of this process, it is not necessary to achieve a high level of precision during the deposition of the ink 9, while also maintaining a high level of precision in the position of the inked mark on the lens 1.

When the ink 9 is induced to overflow from the pattern 4, a marking process according to the invention implements a step of removing the ink deposited in excess. This removing step may for example be carried out by means of an adhesive fabric or piece of paper placed on the surface of the eyeglass 1. The ink 9 that has overflowed from the detreated zone 6, 11 then attaches to the adhesive material. The removal of the adhesive material from the eyeglass 1 is accompanied by the removal of the ink 9, 15 deposited in excess that is bound to said adhesive material. This step of removing ink 9, 15 deposited in excess is advantageously carried out while the ink 9 is still liquid or soft. Specifically, if the removal is performed when the ink 9 has set, it is likely that the removal of the adhesive material will lead not only to the removal of the ink 9, 15 deposited in excess, but also to the removal of a portion of the ink 9 directly forming the pattern 4. The pattern 4 would then be damaged in some parts or even no longer be correctly visible and/or recognisable.

The pad printing method is a blanket method allowing ink 9 to be simultaneously deposited over a large area encompassing the pattern 4 to be reproduced on the eyeglass 1. Pad printing does not allow an eyeglass 1 marking pattern 4 of at least two different colours to be easily obtained because the inking stamp is assumed to carry only a single type of ink 9 of a given colour. With this technique, the pattern will generally be monochromatic.

Inkjet printing is an alternative to deposition by pad printing, but its implementation is more precise and therefore cleaner. Specifically, contrary to the deposition of ink by means of pad printing, with ink jets the deposition is carried out discretely, by means of ink droplets. Thus, for a pattern 4 made up of a single macroscopic recessed print, a plurality of droplets of ink 9 are deposited in the recessed print representative of the pattern 4, in order to completely fill said recessed print. In the case where the recessed print representative of the pattern 4 is made up of a plurality of discrete detreated zones 11 each forming a single discrete well 11, or pixel, one droplet of ink 9 is deposited in each discrete well 11. The discrete wells 11 may advantageously be dimensioned so that the volume of each droplet of ink 9 is slightly larger than the volume of one well 11 so as to guarantee that each well 11 will be completely filled by one droplet of ink 9. Alternatively, the size of the droplets may be adapted so as to have a slightly larger volume than the volume of the wells 11 used to form the pattern 4. This technique of depositing with jets of ink 9 makes it possible to easily produce patterns 4 which may be of at least two different colours 17, 18, in particular when the inkjet technique is coupled with detreated zones composed of wells 11, either adjoining, with only a small ridge separating each well 11, or fully separated. These two-colour or multicolour patterns 4 are preferably obtained when they are made up of a multiplicity of separate wells 11, in each of which ink 9, 17, 18 of a quite specific colour may be deposited. It is desirable for the discrete wells to be separate in order to prevent the two inks 17, 18, or at least two droplets of ink of different colours from mixing. With the inkjet depositing technique, it is also possible to make provision for the ink 9, 17, 18 to overflow from each well 11. A marking process according to the invention then implements a step of removing the ink 15 deposited in excess, which step is identical to that described above for the deposition of ink 9 by pad printing.

A marking process according to the invention is advantageously carried out by means of an apparatus comprising means able to emit a laser beam, means able to deposit an ink and a holder able to hold the eyeglass 1. In this apparatus, the holder remains stationary throughout the duration of the marking process, and said means are movable in order to be alternatively placeable level with an identified zone of the eyeglass in order to allow the eyeglass to be marked. Thus, when it is necessary to produce a detreated zone 6, 11 in the eyeglass 1, the means able to emit a laser beam are placed level with that zone of the eyeglass in which said detreated zone 6, 11 must be produced and controlled to insulate said zone. When the ink 9, 17, 18 must be deposited in a detreated zone of the eyeglass 1, the means able to emit a laser beam are withdrawn in order to make room for the means able to deposit ink 9, 17, 18 in the detreated zone 6, 11. All these operations of moving the various means back-and-forth are programmed in advance depending on the shape and dimensions of the pattern 4 to be deposited on the eyeglass. The characteristics of the pattern 4 and the one or more colours to be used constitute input data of this apparatus. The fact that the holder for the eyeglass 1 remains stationary (immobile) throughout the duration of the marking process allows a constant frame of reference to be preserved during all the operations to be carried out on the eyeglass 1, guaranteeing exactness, precision and therefore a good reproducibility for the marking.

Alternatively, this advantage may be unused and those two steps may be replaced by a step of displacing the eyeglass 1 first toward one area of the apparatus comprising the means able to emit a laser and then toward an area of the apparatus comprising the means able to deposit ink 9, 17, 18.

A mark on an optical eyeglass 1 produced by means of a process according to the invention is intended to be permanent and to last the entire lifetime of the eyeglass 1. It is not a provisional mark intended to be changed on a simple request or a mark intended to help to position the lens in an edger and intended to be removed after an edging step has been done or before mounting the lens into a frame, or at least before providing the spectacles comprising the eyeglass to its intended wearer.

The term "MARK" appearing on the eyeglasses in FIGS. 1A and 1B is a purely illustrative example of a pattern 4 that could be produced by means of a marking process according to the invention. This term is not associated with any particular commercial entity, and is representative of no particular trademark or logo. In this example, each letter represents one macroscopic element of the final pattern 4 to be produced.

The marking process according to the invention may be carried out for example by means of a pulsed laser emitting a beam at a wavelength of 266 nm with pulses of 1 ns duration, an energy per pulse of 20 µJ and a marking point area of about 20 µm diameter. The energy and the number of repetitions may be adjusted depending on the number of layers of the "multilayer" and the nature of these layers. In one particular exemplary embodiment, the number of repetitions at each marking point is four.

According to more generic embodiments of the invention, the electromagnetic beam is emitted in pulses, and the energy per pulse is comprised in the interval 1 to 50 µJ and for example equal to 5 µJ, 10 µJ, 15 µJ or 20 µJ.

The detreatment can be achieved by local exposure to a focused beam of pulsed ultraviolet laser radiation having at least the following parameters:
  radiation of wavelength comprised in the interval 200 to 400 nm and preferably 200 to 360 nm and for example 213 nm, 266 nm or 355 nm;
  a pulse duration comprised in the interval 0.1 to 5 ns; and at the marking point, a beam diameter comprised in the interval 20 to 50 µm.

According to one advantageous embodiment, the focused beam furthermore has at least one of the following parameters:
  a pulse frequency comprised between about 100 Hz and about 10 kHz; and/or
  a peak power comprised between about 2.5 kW and about 1 MW.

According to one exemplary embodiment, the device is configured so that the focused beam of ultraviolet laser radiation has at least one of the following parameters:
  the pulse frequency is comprised between about 100 Hz and about 1 kHz; and/or
  the peak power is comprised between about 10 kW and about 100 kW; and/or
  a pulse duration comprised between about 0.5 ns and about 2 ns.

The expression "peak power" is here understood to mean the instantaneous power of the laser during a pulse. It is to be contrasted for example with what is referred to as "effective" power, which is an average of the power over time; the latter is therefore generally much lower since it is by definition zero between pulses.

According to one embodiment, the device includes a solid-state laser source configured to emit a pulsed infrared radiation beam, and a multiplier, positioned at the output of the laser source and configured to multiply a radiation frequency of the infrared beam emitted as output from the laser source, preferably by a factor comprised between three and ten.

In the context of the invention, the expression "solid-state laser source" is understood to mean a laser source the gain medium of which, also referred to as the active medium, is either a solid or ionic crystal or an optical fiber. Solid-state laser sources are thus different from lasers having a liquid or gaseous gain medium. In French, the term used to designate solid-state lasers is "laser à milieu solide".

The multiplication factor is here chosen as equal to four, but it may, generally, depending on the initial wavelength of the laser source, be a factor comprised between three and ten inclusive and preferably between three and five.

The multiplier is configured to form, by coupling to the laser source, a beam of ultraviolet laser radiation having a wavelength comprised between about 200 nm and about 300 nm, more preferably between about 208 nm and about 220 nm, for example about 213 nm or about 210 nm or about 209.4 nm or even between about 260 nm and about 270 nm, for example about 261.7 nm or about 263 nm or about 266 nm.

The laser source and the multiplier are two elements that may be separate, or contained in the same housing. If needs be, the combination of a solid-state laser and a multiplier in the same housing allows a possibly very compact device to be obtained and therefore one that is transportable and transposable at will, both on a manufacturing line and in the laboratory for example.

The laser source is for example an Nd-YAG laser and the multiplier is for example configured to quadruple the frequency of pulses output from the Nd-YAG laser.

An Nd-YAG source may principally emit a beam at the wavelength 1064 nm, thereby making it possible, with coupling to a quadrupler, i.e. a factor-four multiplier, to obtain a beam of laser radiation with a wavelength of about 266 nm, or of about 213 nm with a quintupler, i.e. a factor-five multiplier.

According to one particular exemplary embodiment, the Nd-YAG laser with a multiplier is a Crylas eco mopa UV laser (266 nm).

According to one alternative, the laser source is for example an Nd-YVO4 laser. Such a laser source for example emits radiation of a wavelength of about 1064 nm, which, coupled to a quadrupler, makes it possible to obtain laser beams of wavelength of about 266 nm, or of about 213 nm with a quintupler.

According to another alternative, the laser source is for example an Nd-YLF laser. Such a laser source for example emits radiation of a wavelength of about 1047 nm or radiation of a wavelength of about 1053 nm depending on its operating mode, which, coupled to a quadrupler, makes it possible to obtain laser beams of wavelength of about 262 nm or 263 nm, or even of about 209 nm or 210 nm with a quintupler.

Generally, the source and the multiplier are configured to emit ultraviolet radiation comprised between 10 and 120 µJ.

Preferably here, according to particular arrangements, the laser source is configured to emit a pulsed beam of laser radiation having an energy per pulse comprised between about 30 µJ and about 80 µJ and preferably higher than 40 µJ. The energy of the focused beam of ultraviolet radiation would then be comprised between about 5 µJ and about 65 µJ.

According to one preferred method of implementation, the device includes an optical assembly provided with an F-theta lens, which lens is configured to focus a beam of ultraviolet laser radiation onto a focal plane of the F-theta lens with a focused beam diameter in the focal plane of the order of about 20 µm to about 50 µm, 30 µm for example.

The F-theta lens is for example located at the output of the optical assembly.

Here, the expression "F-theta lens" is understood to mean a flat field lens that by definition has a focal plane at a distance referred to as the focal length. The focal length is for example about 160 mm in one preferred exemplary implementation but may more generally be comprised between 100 mm and 200 mm.

The invention claimed is:

1. A process for marking an optical eyeglass equipped with an anti-smudge surface coating and a temporary coating used to facilitate the blocking of the lens in an edging operation and placed on said anti-smudge surface coating, comprising the following steps:
providing an anti-smudge surface coating in the optical eyeglass;
placing a temporary coating on said anti-smudge surface coating;
detreating by a laser beam despite the presence of the temporary coating, so as to locally detreat an area of the optical eyeglass by removing the temporary coating and the anti-smudge surface coating until a lower layer of the eyeglass is reached, which layer is located under said anti-smudge surface coating and made of a material that is different from the anti-smudge surface coating, thus forming at least one detreated zone that passes through the temporary coating and the anti-smudge surface coating;
removing the temporary coating; and
depositing ink in the detreated zone in order to form at least one inked pattern, so that the ink adheres to the lower layer present at the bottom of the detreated zone;
wherein the at least one detreated zone is made up of a plurality of holes forming pixels;
wherein at least two different inks of different colors are deposited in adjacent holes to obtain a two-color or polychromatic pattern or macroscopic pattern element;
wherein deposition of inks of different colors in adjacent holes prevents the deposited inks from mixing; and
wherein the step of depositing the ink in said at least one detreated zone is carried out by pad printing by an inking stamp which is dimensioned to cover at least the entirety of the pattern created by the at least one detreated zone created on the surface of the optical eyeglass, and wherein the inking stamp has a geometric shape selected from a parallelepipedal shape and an ovoid shape.

2. The process according to claim 1, wherein the detreatment step allows at least two separate detreated zones to be obtained that are arranged in at least one group forming a macroscopic pattern element.

3. The process according to claim 1, wherein the ink is deposited in excess and extends beyond said at least one detreated zone, said process furthermore comprising a step of removing the ink that has overflowed from said at least one detreated zone.

4. The process according to claim 3, wherein the removing step is carried out by an adhesive laid flat on the surface coating, said adhesive being removed and taking with it the ink that overflowed from said at least one detreated zone onto said coating.

5. The process according to claim 3, wherein the ink is hardened after deposition, by drying, polymerisation or thermosetting, and the step of removing the excess ink is carried out when said ink is still liquid or soft.

6. The process according to claim 1, wherein the detreated zones form wells that are separated from one another or at least one detreated zone forms a plurality of adjoining wells that are separated from one another by a protrusion comprising no surface coating.

7. The process according to claim 6, wherein said wells have substantially the same dimensions as those of the laser beam at a point of impact with the surface.

8. The process according to claim 1, comprising a step of determining the inked pattern from a list of at least two different inked patterns, the dimensions of the inking stamp being such that said inking stamp deposits a plurality of inked patterns from said list.

9. The process according to claim 1, comprising a step of establishing a frame of reference of an uncut eyeglass, said step including a step of determining a position of the pattern on the eyeglass taking into account a post-edging shape of the eyeglass and mounting data, so as to place the pattern in a zone comprised in the outline of the post-edging shape of the eyeglass, the step of creating detreated zones being carried out on the uncut eyeglass.

10. The process according to claim 1, wherein when the detreated zone formed by a plurality of points of impact of the laser comprises a thinned zone at least one dimension of which is smaller than those of an ink droplet deposited on the material of the bottom of said thinned zone, the excess ink is absorbed by an adjacent zone of larger size or is removed with suitable removing means.

11. The process according to claim 1, wherein an interference stack is separated from the substrate by one or more varnishes.

12. The process of claim 1, wherein the ink is deposited by an inkjet printer that deposits a droplet of ink within each discrete hole such that each discrete hole is completely filled with ink.

13. An apparatus for carrying out a process according to claim 1, comprising means suitable for emitting a laser beam, means able to deposit an ink and a holder able to hold the eyeglass, said holder remaining stationary throughout the duration of the marking process and said means being movable in order to be alternatively placeable level with an identified zone of the eyeglass in order to allow the eyeglass to be marked.

14. An optical eyeglass obtained by the process of claim 1 including a surface coating, at least one detreated zone in said coating, and ink that is absorbent in the visible and/or UV spectrum, present in said detreated zone.

* * * * *